United States Patent

Iwata

[11] Patent Number: 6,079,511
[45] Date of Patent: Jun. 27, 2000

[54] VEHICLE DRIVE FORCE CONTROL DEVICE

[75] Inventor: Toru Iwata, Yokohama, Japan

[73] Assignee: Nissan Motor Co., Ltd., Yokohama, Japan

[21] Appl. No.: 09/073,938

[22] Filed: May 7, 1998

[30] Foreign Application Priority Data

May 13, 1997 [JP] Japan ................................. 9-121993

[51] Int. Cl.[7] .................................................. B60K 27/02
[52] U.S. Cl. .......................... 180/197; 303/145; 701/85; 701/86
[58] Field of Search .......................... 180/197; 303/142, 303/139, 145; 701/84, 85, 86, 82

[56] References Cited

U.S. PATENT DOCUMENTS

| | | | |
|---|---|---|---|
| 5,829,544 | 11/1998 | Ishizu | 180/197 |
| 5,927,421 | 7/1999 | Fukada | 180/197 |

FOREIGN PATENT DOCUMENTS

| | | |
|---|---|---|
| 8-144803 | 6/1996 | European Pat. Off. . |
| 43 28 835 | 3/1995 | Germany . |
| 44 00 259 | 7/1995 | Germany . |
| 195 46 554 | 2/1997 | Germany . |
| 44 07 475 | 9/1999 | Germany . |
| 8-144803 | 6/1996 | Japan . |

*Primary Examiner*—Chris Schwartz
*Assistant Examiner*—C. T. Bartz
*Attorney, Agent, or Firm*—Foley & Lardner

[57] ABSTRACT

In a lean burn engine for a vehicle wherein an ordinary air-fuel ratio and a lean air-fuel ratio are selectively applied, an engine output is reduced when a slip of a drive wheel is detected. By controlling the air-fuel ratio when the engine output is reduced to an ordinary air-fuel ratio, the engine is prevented from becoming unstable even when output is reduced at a lean air-fuel ratio. Preferably, when the engine output reduction has terminated, the air-fuel ratio is returned to the air-fuel ratio prior to the output reduction.

17 Claims, 7 Drawing Sheets

VEHICLE DRIVE FORCE CONTROL DEVICE

FIELD OF THE INVENTION

This invention relates to drive force control for preventing slip of drive wheels of a vehicle equipped with a lean burn engine.

BACKGROUND OF THE INVENTION

A drive force controller or a traction control system which prevents drive wheels from slipping during acceleration of a vehicle so as to prevent acceleration performance from falling, for example decreases the output of an engine according to slip of the drive wheels.

This decrease in output is obtained for example by closing the opening of a second throttle which is disposed in an intake passage of the engine in series with the first throttle, stopping injection of fuel to specific cylinders, or retarding a fuel ignition timing.

Tokkai Hei 8-144803 published by the Japanese Patent Office in 1996, discloses a drive force controller for a lean burn engine in which combustion is performed at a leaner air-fuel ratio than a stoichiometric air-fuel ratio, and fuel cut is performed by stopping fuel injection to specific cylinders of the engine.

However when the lean burn operation of the engine is performed in parallel with the fuel cut operation, the engine operation is apt to become unstable. Especially, in case the lean burn system is adopted in a direct injection gasoline engine wherein gasoline is directly injected into a cylinder, fuel cut operation easily causes unstable engine operation. In such an engine, uniform combustion is performed at an ordinary air-fuel ratio in the vicinity of the stoichiometric air-fuel ratio, and stratified combustion is performed with a lean air-fuel ratio. The air-fuel ratio in stratified combustion is even leaner than the lean air-fuel ratio of an ordinary lean burn engine, and stratified combustion therefore requires a large intake air volume.

Therefore, when throttle operation was performed during fuel cut in the stratified combustion state, the engine running state may become even more unstable.

The output reduction of the engine due to fuel cut may also become excessive when there are only a few cylinders in the engine.

SUMMARY OF THE INVENTION

It is therefore an object of this invention to prevent the engine running state from becoming unstable in a lean burn engine used in conjunction with a drive force controller which functions by reducing engine output.

It is a further object of this invention to prevent the output fluctuation of the engine from becoming excessive when a lean burn engine is used in combination with a drive force controller which functions by reducing engine output.

In order to achieve the above objects, this invention provides a vehicle drive force control device comprising a fuel injection valve for injecting fuel into an engine, a mechanism for varying the output of the engine, sensors for detecting a slip of a drive wheel, and a microprocessor.

The microprocessor is programmed to selectively control an air-fuel ratio of an air-fuel mixture supplied to the engine via the fuel injection valve so that the air-fuel ratio is equal to either an ordinary air-fuel ratio which is approximately equal to a stoichiometric air-fuel ratio, or a lean air-fuel ratio leaner than the ordinary air-fuel ratio, control the output varying mechanism so as to reduce the output of the engine when a slip of the drive wheel is detected, and control the air-fuel ratio of the air-fuel mixture to the ordinary air-fuel ratio as the output of the engine is reduced by the output varying mechanism.

It is preferable that the microprocessor is further programmed to return the air-fuel ratio of the air-fuel mixture to an air-fuel ratio before the output reduction of the engine was started by the output varying mechanism when the output reduction of the engine by the output varying mechanism has terminated.

It is further preferable that the device further comprises a sensor for detecting a load state of the engine, and the microprocessor is further programmed to control a variation rate of the air-fuel ratio between the ordinary air-fuel ratio and the lean air-fuel ratio according to the load state of the engine.

It is still further preferable that the load detecting sensor comprises a sensor for detecting either an intake air amount of the engine or a rotation speed of the engine.

It is also preferable that the output varying mechanism comprises the fuel injection valve which stops fuel injection according to a signal from the microprocessor, and the microprocessor is further programmed to count a number of fuel injection valves in which fuel injection has stopped, and control a variation rate of the air-fuel ratio between the ordinary air-fuel ratio and a lean air-fuel ratio according to the number.

It is also preferable that the output varying mechanism comprises either of the fuel injection valve which stops fuel injection according to a signal from the microprocessor, and a throttle for reducing an intake air amount of the engine according to a signal from the microprocessor.

It is also preferable that the microprocessor is further programmed to calculate a target engine output and control the output varying mechanism so that the output of the engine coincides with the target engine output.

This invention also provides a vehicle drive force control device comprising a fuel injection valve for injecting fuel into an engine, a mechanism for varying the output of the engine, sensors for detecting a slip of a drive wheel, and a microprocessor.

The microprocessor is programmed to selectively control a combustion state of the engine either to uniform combustion or to stratified combustion via the fuel injection valve, control the output varying mechanism so as to reduce the output of the engine when a slip of the drive wheel is detected, and control the combustion state of the engine to uniform combustion as the output of the engine is reduced by the output varying mechanism.

It is preferable that the microprocessor is further programmed to return the combustion state of the engine to a combustion state before the output reduction of the engine was started by the output varying mechanism when the output reduction of the engine by the output varying mechanism has terminated.

It is further preferable that the device further comprises a sensor for detecting a load state of the engine, and the microprocessor is further programmed to control a variation rate of the combustion state between the uniform combustion and stratified combustion according to the load state of the engine.

It is still further preferable that the load detecting sensor comprises a sensor for detecting either an intake air amount of the engine or a rotation speed of the engine.

It is also preferable that the output varying mechanism comprises the fuel injection valve which stops fuel injection according to a signal from the microprocessor, and the microprocessor is further programmed to count a number of fuel injection valves in which fuel injection has stopped, and control a variation rate of the combustion state between the uniform combustion and stratified combustion according to the number.

It is also preferable that the output varying mechanism comprises either the fuel injection valve which stops fuel injection according to a signal from the microprocessor, or a throttle for reducing an intake air amount of the engine according to a signal from the microprocessor.

It is also preferable that the output varying mechanism comprises a throttle for reducing an intake air amount of the engine according to a signal from the microprocessor, and the microprocessor is further programmed to control an opening of the throttle to an opening corresponding to the uniform combustion at a first rate, and subsequently control the opening corresponding to the signal at a second rate slower than the first rate, as the output of the engine is reduced by the output varying mechanism.

It is also preferable that the microprocessor is further programmed to calculate a target engine output, and control the output varying mechanism so that the output of the engine coincides with the target engine output.

The details as well as other features and advantages of this invention are set forth in the remainder of the specification and are shown in the accompanying drawings.

DESCRIPTION OF THE PREFERRED EMBODIMENTS

Figure 1:
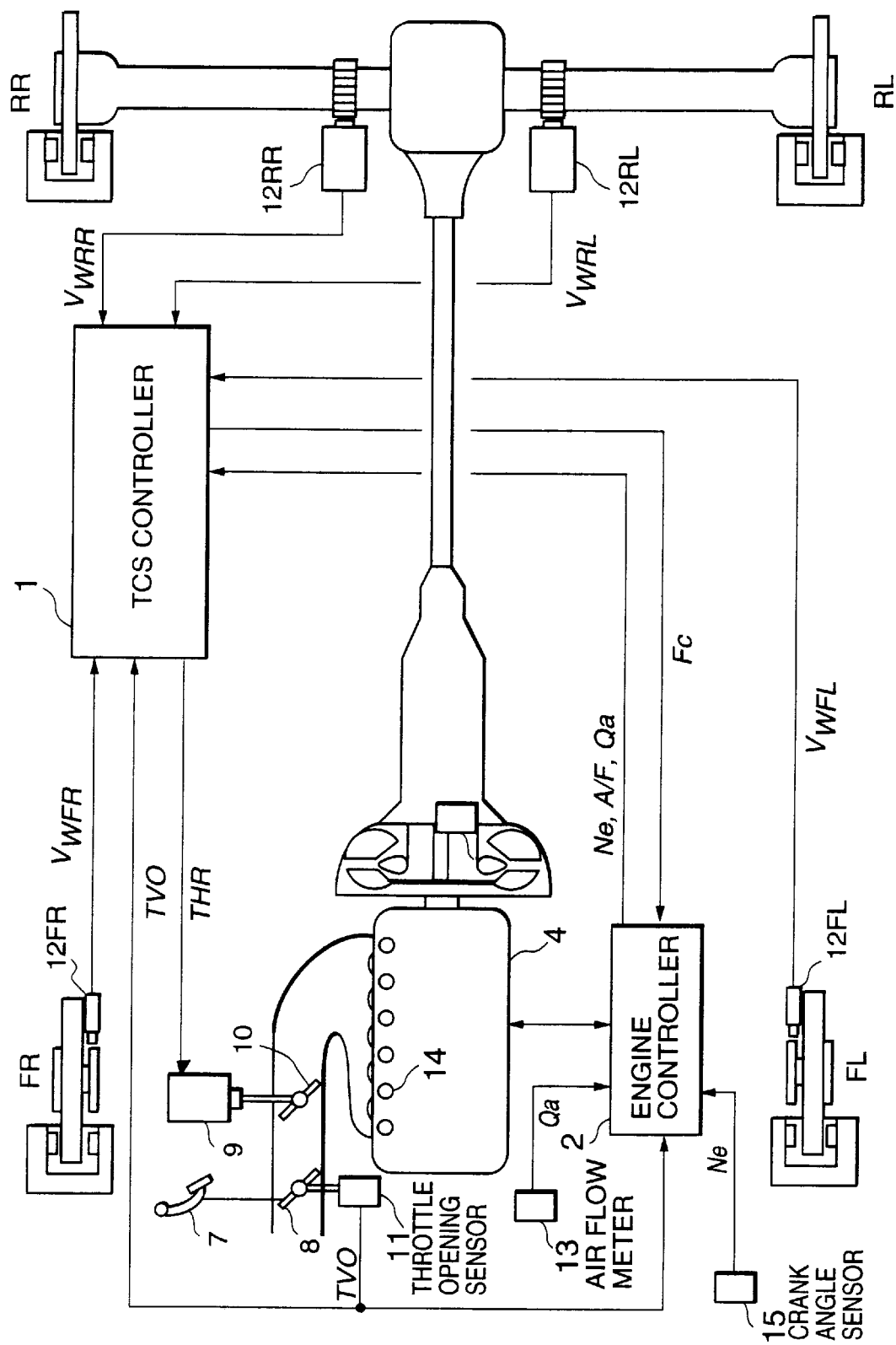
FIG. 1 is a schematic diagram of a drive force control device according to this invention.

Referring to FIG. 1 of the drawings, a drive force control device for a vehicle according to this invention is provided with a TCS controller 1 and an engine controller 2 respectively comprising a micro computer.

The engine controller 2 selectively applies an ordinary air-fuel ratio in the vicinity of the stoichiometric air-fuel ratio or a lean air-fuel ratio according to the running state of the vehicle, and performs air-fuel ratio control and ignition timing control of the engine 4 by outputting a fuel injection signal to a fuel injection valve 14 provided in each cylinder of the engine. The engine 4 transmits a drive force to the rear wheels RR, RL via a transmission. In the following description, the left and right rear wheels RL, RR are the drive wheels, and the left and right front wheels FL, FR are the driven wheels.

A first throttle 8 which is opened and closed according to the depression of an accelerator pedal 7 and a second throttle 10 controlled via actuator 9 by the TCS controller 1, are arranged in series in an intake passage of the engine 4.

The opening TVO of the first throttle 8 is detected by a throttle opening sensor 11, and is output as a signal to the TCS controller 1 and engine controller 2. A depression amount of the accelerator pedal 7 may be detected instead of the throttle opening TVO.

An air flow meter 13 is provided in the intake passage. The air flow meter 13 detects an intake air amount Qa of the intake passage, and this is input into the engine controller 2. An engine rotation speed Ne which is detected by a crank angle sensor 15 is input into the engine controller 2.

Signals from wheel speed sensors 12FR, 12FL, 12RR, 12RL which detect the rotation speed of vehicle wheels or a vehicle shaft are also respectively input into the TCS controller 1.

The TCS controller 1 detects a slip of the drive wheels RR, RL based on wheel speeds VWFR, VWFL, VWRR, VWRL, and a drive force control request signal is output to the engine controller 2 when the drive wheels RR, RL slip. The engine controller 2 thereby controls the output of the engine 4 by performing fuel cut in a specific cylinder or cylinders and by performing air-fuel ratio control described hereafter as in the aforesaid prior art example.

When the drive wheels RR, RL slip, a second throttle opening THR is calculated, and the TCS controller 1 modifies the opening of the second throttle 10 via an actuator 9. Due to this, the intake air amount Qa is made to vary according to a target engine output torque.

Figure 2:
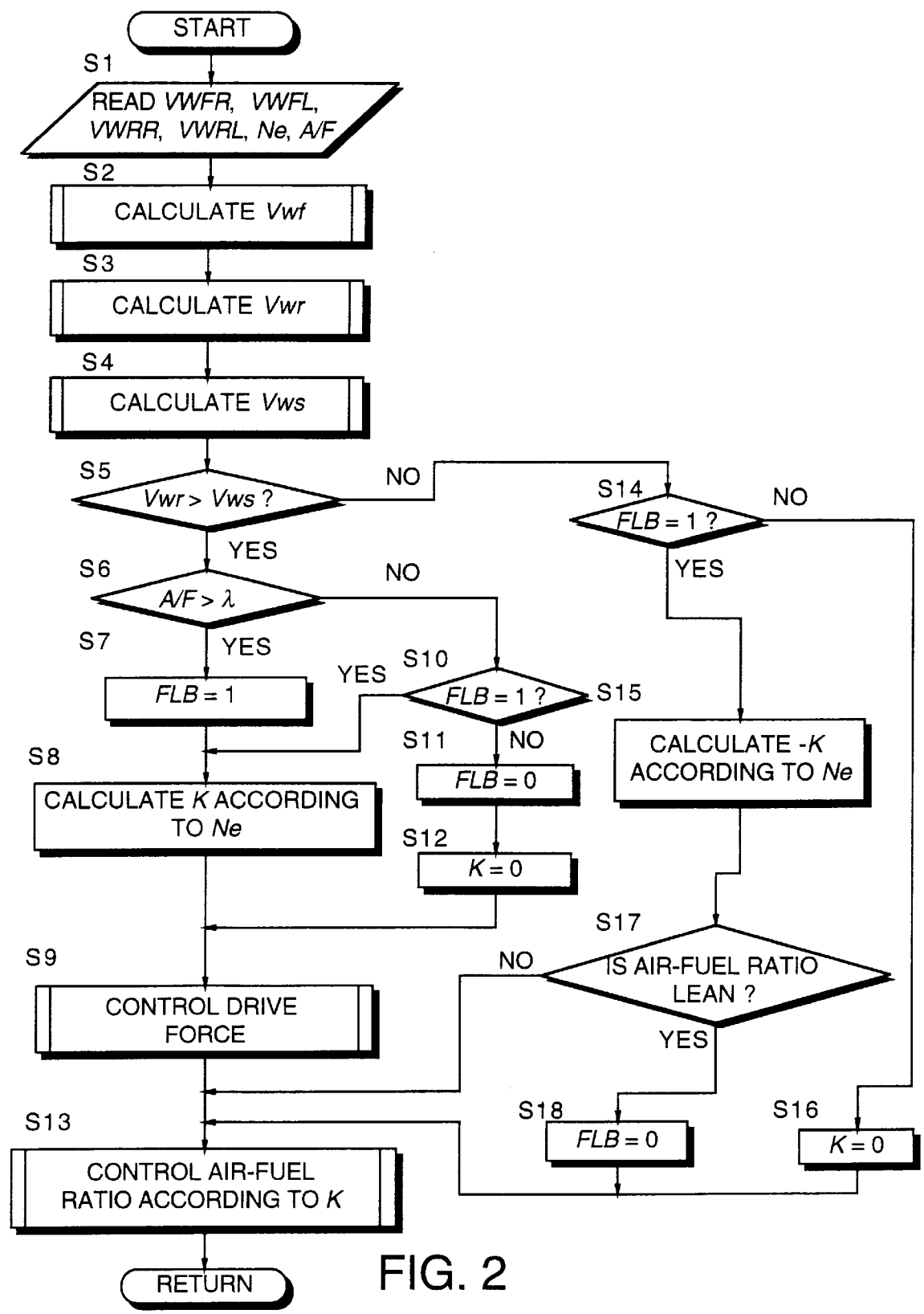
FIG. 2 is a flowchart to explain a drive force control process performed by a TCS controller and engine controller with which the control device is equipped.

The aforementioned drive force and air-fuel ratio control process performed by the TCS controller 1 and engine controller 2 will next be described referring to the flowchart of FIG. 2.

This process is performed at a predetermined interval, e.g. 10 milliseconds.

In a step S1, the TCS controller 1 reads the output of the wheel speed sensors 12FR–12RL, and calculates the wheel speeds VWFR, VWFL, VWRR, VWRL. The engine controller 2 reads the rotation speed Ne of the engine 4, opening TVO of the first throttle 8 and intake air amount Qa.

In a step S2, an average velocity Vwf of a driven wheel is found as a mean of the wheel speeds VWFR and VWFL of the left and right front wheels FL and FR.

In a step S3, an average velocity Vwr of the drive wheels is found as the average value of the wheel speeds VWRR, VWRL of the left and right rear wheels RL, RR.

In a step S4, a target drive wheel speed Vws which is a target value of drive force control is found by adding a predetermined value $\alpha$ to a driven wheel average speed Vwf representing a current vehicle speed.

$$Vws = Vwf + \alpha$$

where, $\alpha$ is preferably set within the range of 2–5 Km/hr.

In a step S5, it is determined whether or not the drive wheels are slipping by comparing the average drive wheel speed Vwr with the target drive wheel speed Vws.

When the drive wheel average speed Vwr exceeds the target drive wheel speed Vws, it is determined that the drive wheels have slipped, and the routine proceeds to a step S6. When the drive wheel average speed Vwr is equal to or less than the target drive wheel speed Vws, it is determined that the vehicle is running normally and the routine proceeds to a step S14.

The processing of the above-mentioned steps S2–S5 is performed by the TCS controller 1.

In the step S6, it is determined whether or not the present air-fuel ratio of the air-fuel mixture supplied by the engine controller 2 to the engine 4 is larger than the ordinary air-fuel ratio, i.e. it is determined whether or not the vehicle is being driven with a lean air-fuel ratio. This can be determined for example from the above-mentioned air-fuel ratio control data.

When the vehicle is running on the lean air-fuel ratio, the routine proceeds to a step S7 and then to a step S8 after setting a lean flag FLB to 1. On the other hand when the vehicle is running on the ordinary air-fuel ratio, the routine proceeds to a step S10.

In the step S8, a parameter K for describing a variation rate from the present air-fuel ratio to the ordinary air-fuel ratio is calculated according to the engine rotation speed Ne.

Figure 3:
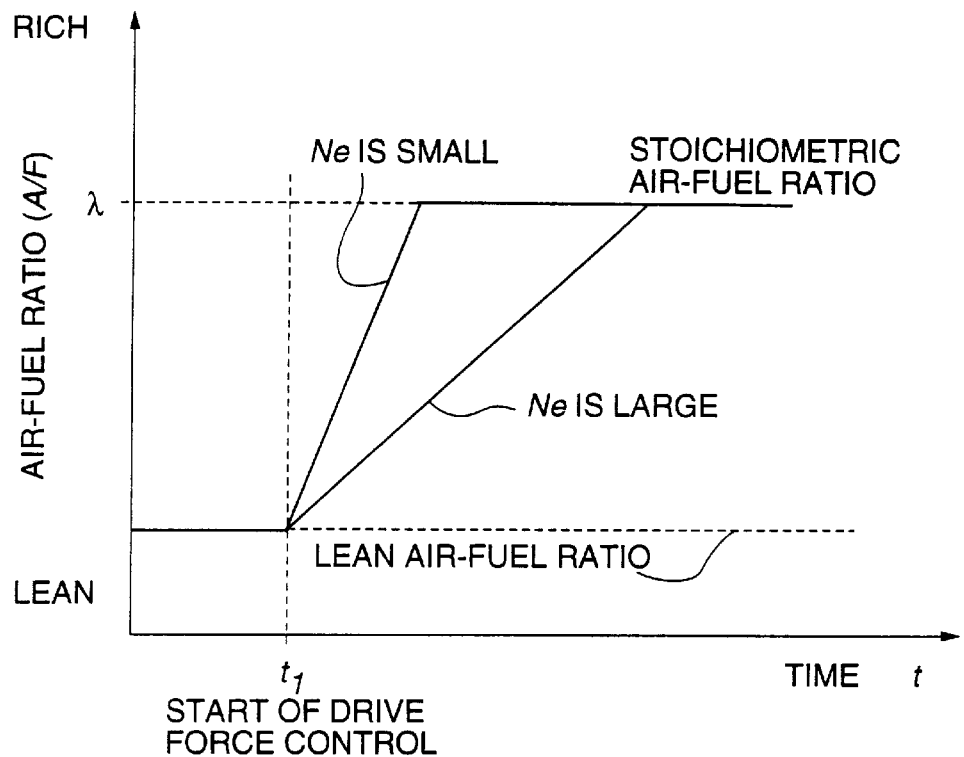
FIG. 3 is a timing chart describing an air-fuel ratio change when the control device starts drive force control.

The variation rate K is set to be small the higher the engine rotation speed Ne as shown in FIG. 3. Herein K is represented by the slopes of the solid lines. A map of this type is stored beforehand in the engine controller 2, and the engine controller 2 calculates this rate K by referring to the map based on the engine rotation speed Ne in the step S8.

On the other hand when the routine proceeds to the step S10, it is determined whether or not the lean flag FLB set on the immediately preceding occasion that the process was performed, is set to 1. When the flag FLB is 1, the routine proceeds to the step S8 in case of 1, and when the flag FLB is not 1, the lean flag is set to 0 in a step S11. In this case, the routine proceeds to a step S9 after having set the air-fuel ratio variation rate K=0 in a step S12. The processing of the steps S6–S8, S10–S12 is performed by the engine controller 2.

In the step S9, the TCS controller 1 calculates a slip rate S of the drive wheels by the following equation.

$$S = Vwr/Vwf$$

The TCS controller 1 determines the second throttle opening THR according to this slip rate S. The engine controller 2 determines a number of cylinders FC in which fuel cut is performed corresponding to the drive force control request signal output by the TCS controller 1 according to this slip rate S. The number of fuel cut cylinders FC and the second throttle opening THR are respectively calculated by referring to preset maps. For this purpose, a map of the second throttle opening THR is prestored by the TCS controller 1, and a map of the number of fuel cut cylinders FC is prestored by the engine controller 2.

After having performed drive force control in the step S9, the engine controller 2 makes the air-fuel ratio vary toward the ordinary air-fuel ratio based on the variation rate K in a step S13.

On the other hand, when it is determined that the vehicle is running normally in the aforesaid step S5, it is determined whether or not the lean flag FLB is 1 in the step S14. When FLB=1, drive force control is not performed, and the variation rate −K is set in a step S15 to return the air-fuel ratio from the ordinary air-fuel ratio to the lean air-fuel ratio depending on the running conditions.

In a step S17, it is determined whether or not the air-fuel ratio is lean. When the air-fuel ratio is not lean, the routine immediately proceeds to a step S13. In the step S13, air-fuel ratio control tending to lean is performed based on the variation rate −K.

When the air-fuel ratio is lean in the step S17, after resetting the lean flag FLB and variation rate K to 0 in a step S18, the routine proceeds to the step S13. As the variation rate K is 0 in this case, air-fuel ratio control is not actually performed in the step S13.

When the lean flag FLB is not 1 in the step S14, after the variation rate K is set to 0 in the step S16, the routine proceeds to the step S13. As the variation rate K is 0 also in this case, air-fuel ratio control is not actually performed in the step S13.

The processing of the above-mentioned steps S14–S16 is performed by the engine controller 2.

Due to the above processing, when the drive wheel speed Vwr exceeds the threshold value Vws due to a slip of the drive wheels RR or RL, drive force control is started, and when the present air-fuel ratio is lean, the air-fuel ratio begins to vary towards the ordinary air-fuel ratio. By preventing the lean air-fuel ratio from continuing during drive force control, excessive fluctuation of the output torque of the engine 4 is suppressed.

Assume that a slip of a drive wheel was detected at a time $t_1$ when the engine is running on the lean air-fuel ratio as shown in FIG. 3. Drive force control is started immediately, and the lean flag FLB is set to 1 in the step S7. The air-fuel ratio also varies from the lean air-fuel ratio towards the ordinary air-fuel ratio with the variation rate K depending on the engine rotation speed Ne.

In this case the variation rate K becomes smaller, and the air-fuel ratio varies more smoothly toward the ordinary air-fuel ratio, the higher the engine rotation speed Ne.

The output torque of the engine 4 increases as the air-fuel ratio varies from the lean air-fuel ratio to the ordinary air-fuel ratio in the vicinity of the stoichiometric air-fuel ratio. Excessive fluctuation of the output torque is suppressed by making the variation of air-fuel ratio smoother the higher the engine rotation speed Ne.

On the other hand, when the engine rotation speed Ne is low, the air-fuel ratio is made to vary rapidly to the ordinary air-fuel ratio by a large variation rate K. Even in this state, the torque output by the engine 4 increases as the air-fuel ratio varies from lean to the ordinary air-fuel ratio in the vicinity of the stoichiometric air-fuel ratio, but as change of output torque has little effect when the engine rotation speed Ne is low, rapid change-over of the air-fuel ratio can be given priority.

When the slip of the drive wheels converges, drive force control is completed, fuel cut is stopped, fuel injection takes place in all cylinders, and the second throttle 10 is in the fully open position of 8/8.

Figure 4:
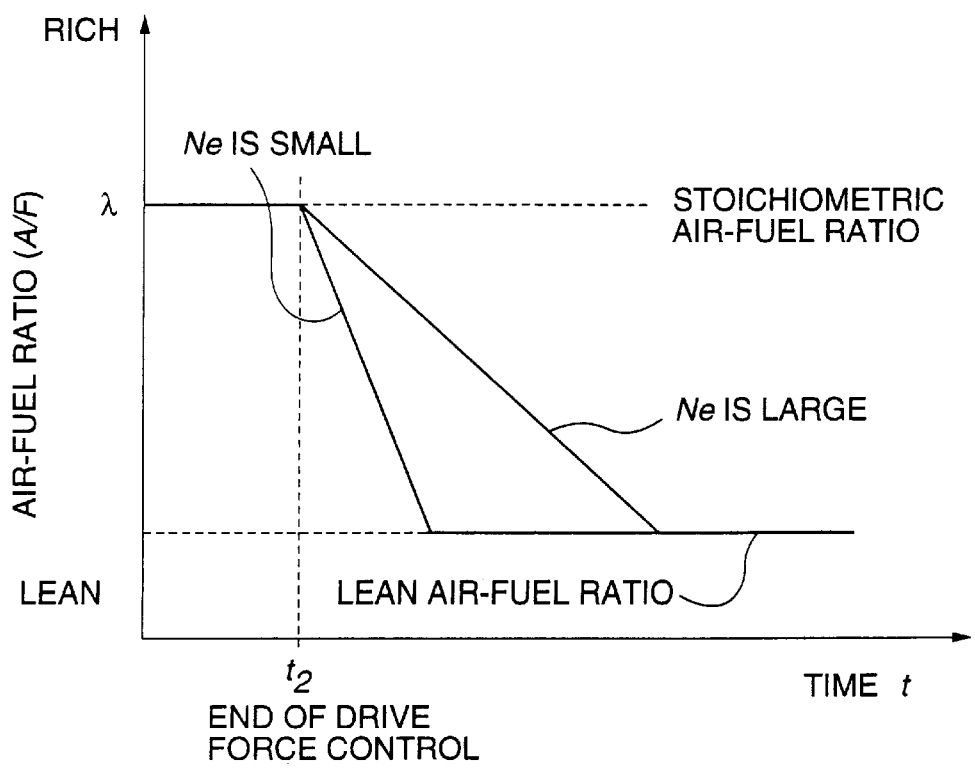
FIG. 4 is a timing chart describing an air-fuel ratio change when the control device terminates drive force control.

In this case, drive force control is completed at a time $t_2$ when the slip of the drive wheels converges as shown in FIG. 4. If the air-fuel ratio before start of drive force control is lean, as the lean flag FLB is set to 1 in the step S7, the processing of the steps S14, S15, S17 is performed, and a change-over from the ordinary air-fuel ratio to the lean air-fuel ratio takes place.

This change-over is performed at the variation rate −K according to the engine rotation speed Ne, and the air-fuel ratio which was temporarily changed over from lean to the ordinary air-fuel ratio due to drive force control, is smoothly returned to the lean air-fuel ratio.

Figure 5:
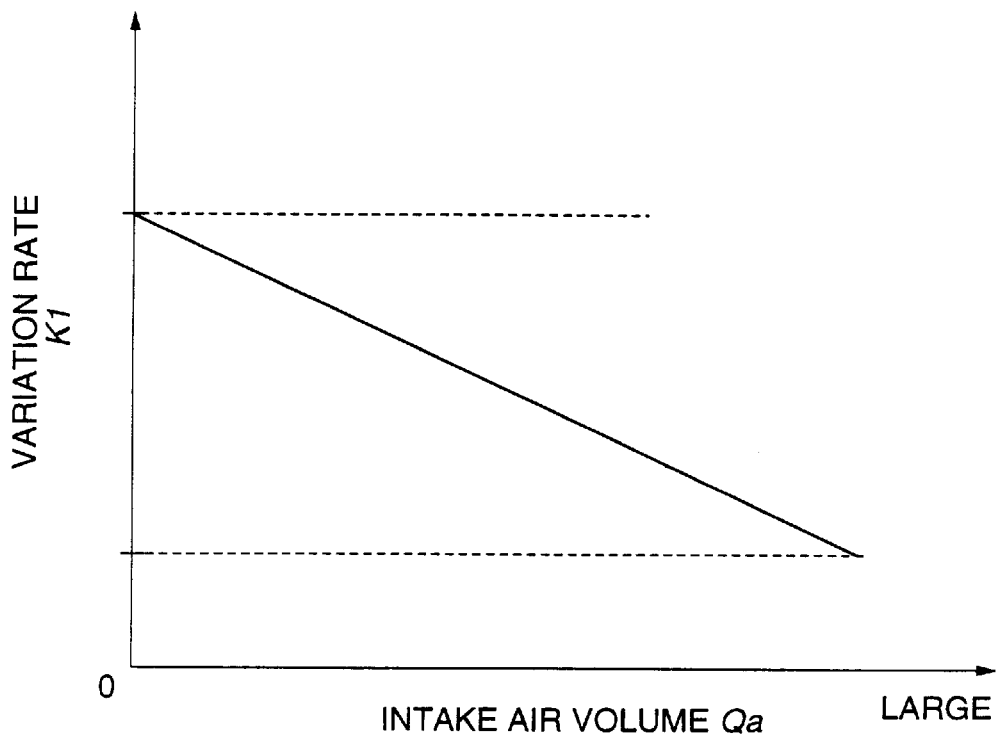
FIG. 5 is a map stored by the TCS controller showing a relation between an intake air amount Qa and a variation rate K1 of air-fuel ratio.
Figure 6:
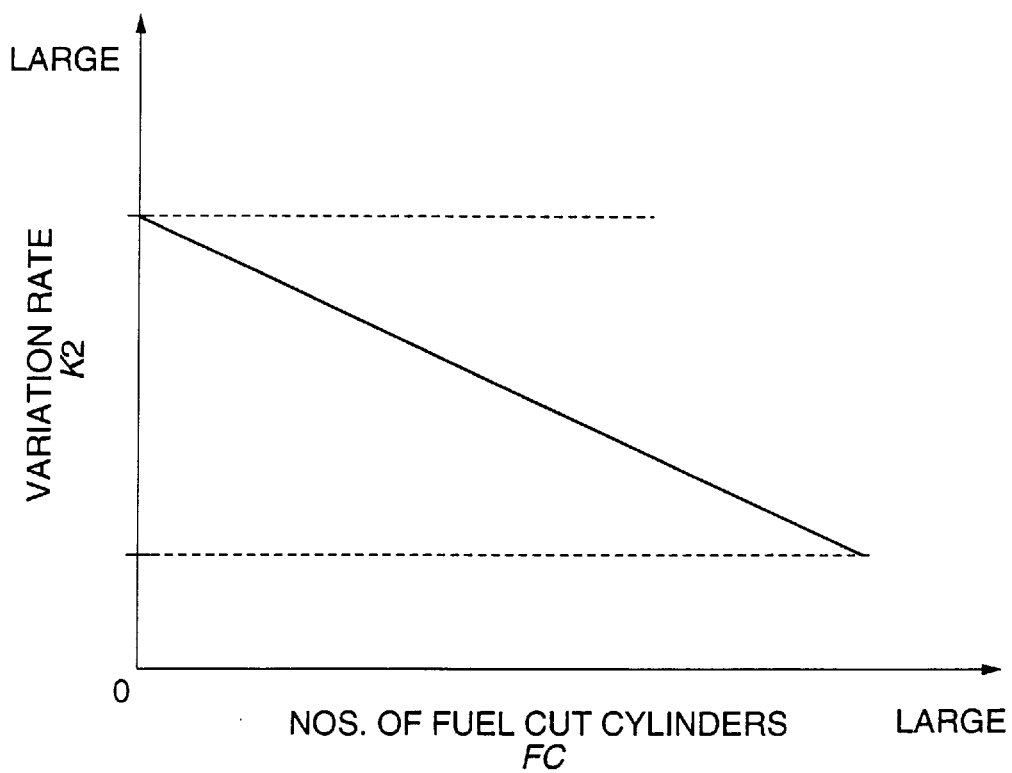
FIG. 6 is a map stored by the TCS controller showing a relation between a number of fuel cut cylinders and a variation rate of air-fuel ratio.

Instead of the air-fuel ratio variation rate K set based on the engine rotation speed Ne, a variation rate K1 based on the intake air amount Qa shown in FIG. 5 may be used. A variation rate K2 based on the number of fuel cut cylinders shown in FIG. 6 may also be used. The variation rate K1 is set to decrease the larger the intake air amount Qa, and the variation rate K2 is set to decrease the larger the number of fuel cut cylinders. The engine rotation speed Ne, intake air amount Qa and number of fuel cut cylinders FC are all values concerned with engine load, and the air-fuel ratio is set to shift more gradually from the lean air-fuel ratio to the ordinary air-fuel ratio the larger the engine load.

FIGS. 7–10 show a second embodiment of this invention.

This embodiment is applied to a lean burn, direct injection type engine.

This engine selectively performs uniform combustion with an ordinary air-fuel ratio in the vicinity of the stoichiometric air-fuel ratio, and stratified combustion with a lean air-fuel ratio. In stratified combustion, the air-fuel ratio is even leaner than in an engine wherein fuel is injected into the intake passage as in the aforesaid first embodiment.

Figure 7:
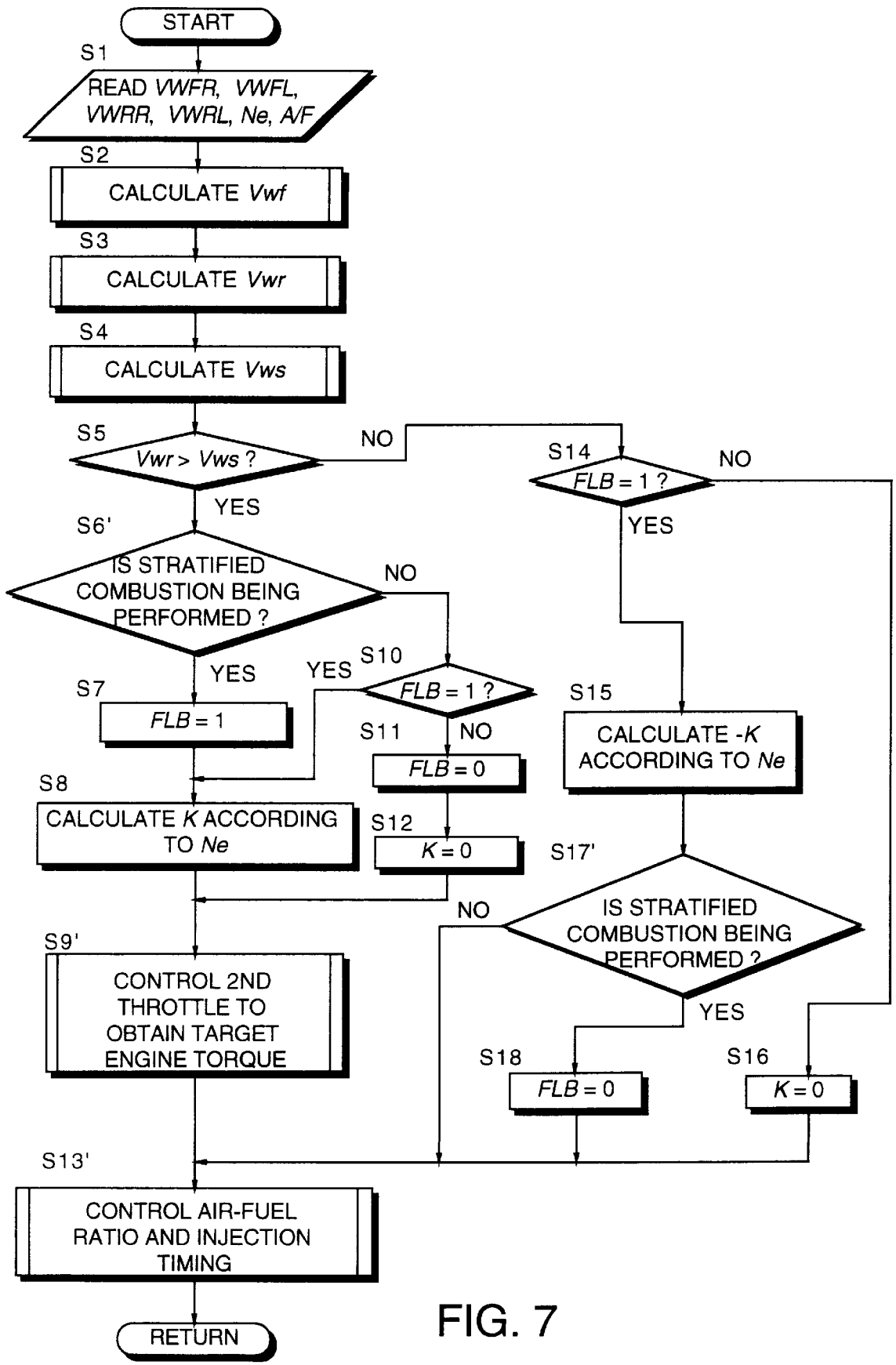
FIG. 7 is similar to FIG. 2, but showing a second embodiment of this invention.

The flowchart of FIG. 7 resembles the flowchart of FIG. 2 of the aforesaid first embodiment, but differs in the following respects. The steps S6 and S17 are replaced by steps S6', S17'. In the steps S6' and S17', instead of determining whether or not the air-fuel ratio is lean, it is determined whether or not stratified combustion is performed. As the fuel injection timing is different for stratified combustion and uniform combustion, this determination by the engine controller 2 is based for example on the output timing of a fuel injection signal.

A step S20 for calculating the target engine torque is inserted between the step S5 and step S6'. The step S9 for performing drive force control is also replaced by a step S9'. The step S13 for air-fuel ratio control is replaced by a step S13'. The remaining steps are the same as those of the aforesaid first embodiment.

Figure 8:
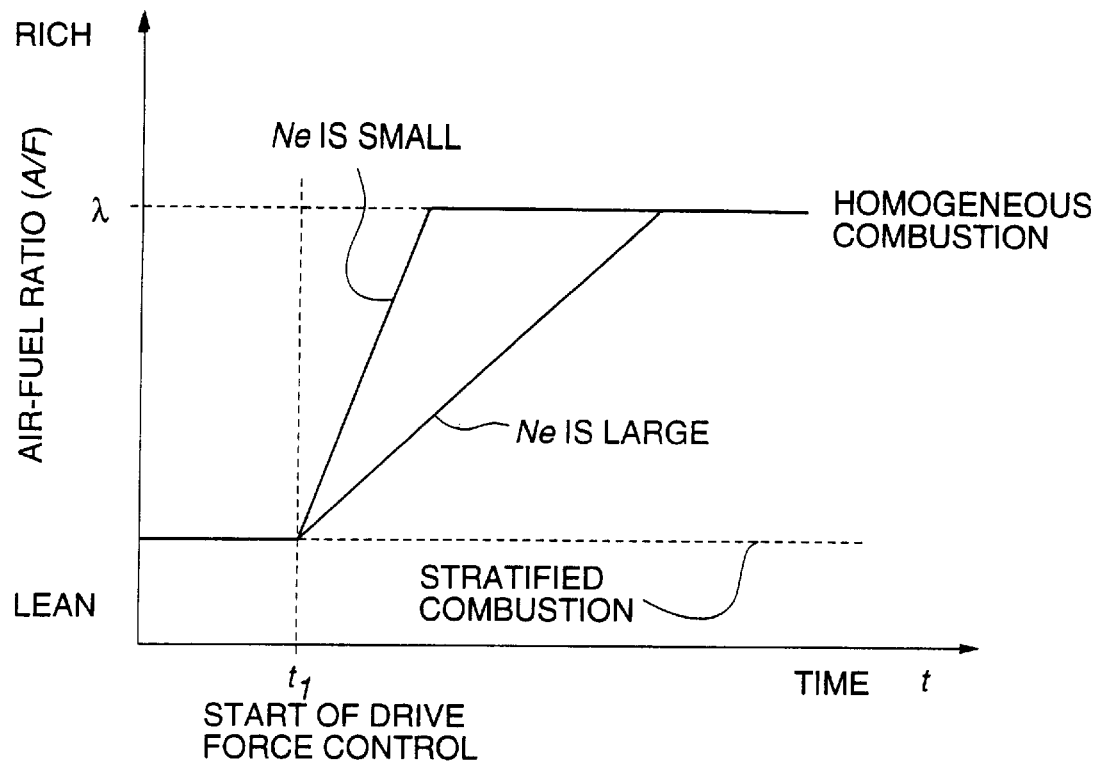
FIG. 8 is similar to FIG. 3, but showing the second embodiment of this invention.

When, as shown in FIG. 8, a slip of the drive wheels is detected at the timing $t_1$ during running at a lean air-fuel ratio in stratified combustion (step S5), the drive force control of the step S20 and subsequent steps starts.

First, in the step S20, a target drive torque which can suppress slip of the drive wheels is calculated based on the intake air amount Qa assuming a uniform combustion state, i.e. the ordinary air-fuel ratio. For calculation of this target drive torque, a function or a map specifying a relation between the engine rotation speed Ne and intake air amount Qa in the uniform combustion state is prestored in the engine controller 2.

In the next step S6', it is determined whether or not stratified combustion is performed.

When stratified combustion is performed, the lean flag FLB is set to 1 in the step S7. Also in the step S8, the air-fuel ratio variation rate K is calculated.

In this case, the air-fuel ratio variation rate K is set according to engine rotation speed or load as in the case of the aforesaid first embodiment as shown in FIG. 8. When rotation speed or load is large, the variation rate K is set to a small value, and when rotation speed or load is small, the variation rate K is set to a large value.

Figure 10:
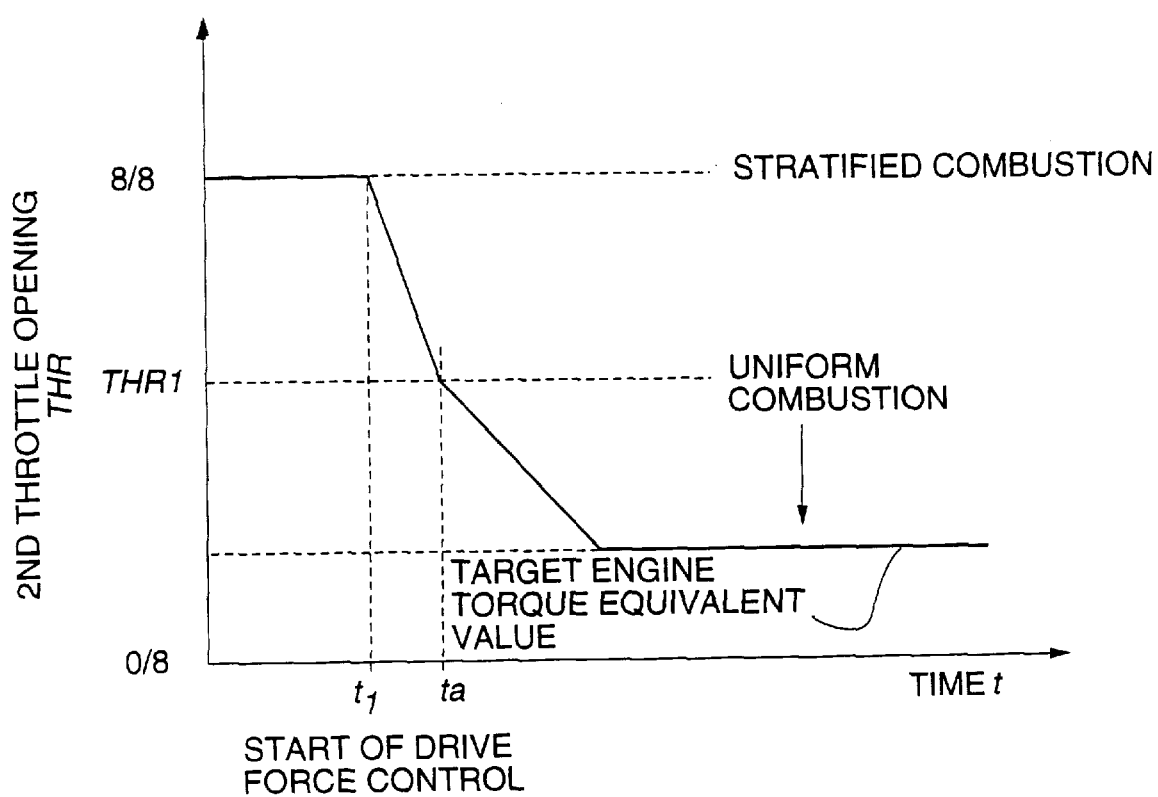
FIG. 10 is a timing chart showing a variation of a throttle opening THR of a second throttle when drive force control starts in a control device according to the second embodiment.

In the step S9', the second throttle opening THR corresponding to the target engine torque calculated in the step S20 is found from a map previously stored in the engine controller 2, and the second throttle 10 is driven in the closing direction via the actuator 9 based on the second throttle opening THR. As shown in FIG. 10, from the timing $t_1$ when drive force control was started, the second throttle 10 is rapidly driven in the closing direction until an opening TR1 when the intake air amount becomes equal to an air amount according to the ordinary air-fuel ratio. At a timing ta when the opening THR1 is reached, the second throttle 10 is driven in the closing direction more gradually than before the timing ta until a target engine torque equivalent value is reached. Fuel cut as in the aforesaid first embodiment is also performed in parallel with the operation of this second throttle 10.

In the step S13', the air-fuel ratio is controlled in the same manner as in the step S13 of the first embodiment. Fuel injection timing is also controlled in this step S13' to control the combustion state of the engine 4 toward uniform combustion or stratified combustion.

As drive force control starts, the output torque starts to increase from when the air-fuel ratio changes from very lean in the stratified combustion state to the ordinary air-fuel ratio in the vicinity of the stoichiometric air-fuel ratio. However, as the intake air volume of the second throttle 10 is reduced, an excessive change of the output torque is suppressed. In this way, smooth drive force control is achieved even in a direct injection type engine.

The calculation of target engine torque need be performed only for the ordinary air-fuel ratio, so the calculation is simple, and it can be performed with speed and high precision.

Figure 9:
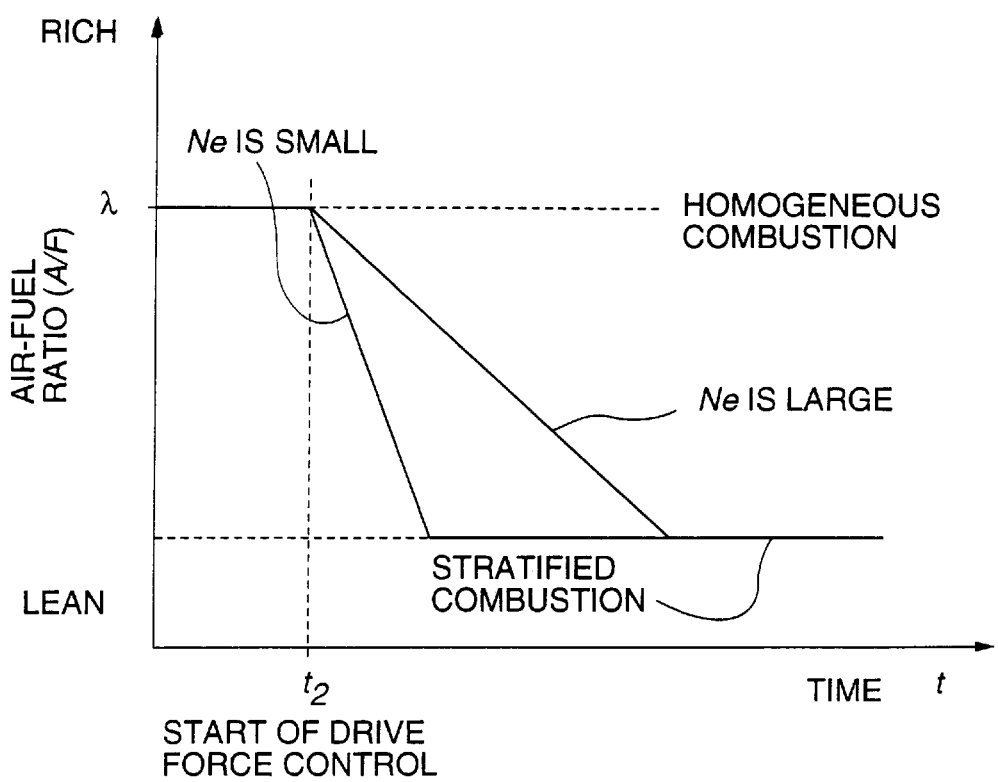
FIG. 9 is similar to FIG. 4, but showing the second embodiment of this invention.

When the slip of the drive wheels converges, drive force control is completed, fuel injection takes place in all cylinders as in the aforesaid first embodiment, and the second throttle 10 returns to the fully open position, i.e. THR=8/8. If the air-fuel ratio before start of drive force control is lean, the lean flag FLB which was set in the step S7 is held at 1. Therefore, when drive force control ends at a timing $t_2$ when the slip of the drive wheels converges, a change-over from uniform combustion with the ordinary air-fuel ratio to stratified combustion with the lean air-fuel ratio starts due to the processing of the steps S14, S15, S17, as shown in FIG. 9. In this case, the air-fuel ratio variation rate –K is set according to engine rotation speed or load as in the case of the aforesaid first embodiment, and the air-fuel ratio shifts smoothly from an ordinary air-fuel ratio to a lean air-fuel ratio according to this variation rate –K.

The corresponding structures, materials, acts, and equivalents of all means plus function elements in the claims below are intended to include any structure, material, or acts for performing the functions in combination with other claimed elements as specifically claimed. The embodiments of this invention in which an exclusive property or privilege is claimed are defined as follows:

What is claimed is:

1. A drive force control device of an engine of a vehicle, the engine driving a drive wheel of the vehicle, the control device comprising:

a fuel injection valve for injecting fuel into the engine, a mechanism for varying the output of the engine, sensors for detecting a slip of the drive wheel, and a microprocessor programmed to:

selectively control an air-fuel ratio of an air-fuel mixture supplied to the engine via said fuel injection valve so that the air-fuel ratio is equal to either of an ordinary air-fuel ratio which is approximately equal to a stoichiometric air-fuel and a lean air-fuel ratio which is leaner than the ordinary air-fuel ratio, control said output varying mechanism so as to reduce the output of said engine when the slip of the drive wheel is detected, and control the air-fuel ratio of said air-fuel mixture to the ordinary air-fuel ratio as the output of said engine is reduced by said output varying mechanism.

2. A drive force control device as defined in claim 1, wherein said microprocessor is further programmed to return the air-fuel ratio of said air-fuel mixture to an air-fuel ratio before the output reduction of said engine was started by said output varying mechanism when the output reduction of said engine by said output varying mechanism has terminated.

3. A drive force control device as defined in claim 2, further comprising a sensor for detecting a load state of said engine, and wherein said microprocessor is further programmed to control a variation rate of the air-fuel ratio between said ordinary air-fuel ratio and the lean air-fuel ratio according to said load state of said engine.

4. A drive force control device as defined in claim 3, wherein said load detecting sensor comprises a sensor for detecting either of an intake air amount of said engine and a rotation speed of said engine.

5. A drive force control device as defined in claim 2, wherein said output varying mechanism comprises said fuel injection valve which stops fuel injection according to a signal from said microprocessor, and said microprocessor is further programmed to count a number of fuel injection valves in which fuel injection has stopped, and control a variation rate of the air-fuel ratio between said ordinary air-fuel ratio and a lean air-fuel ratio according to said number.

6. A drive force controller as defined in claim 1, wherein said output varying mechanism comprises either of said fuel injection valve which stops fuel injection according to a signal from said microprocessor, and a throttle for reducing an intake air amount of said engine according to a signal from said microprocessor.

7. A drive force controller as defined in claim 1, wherein said microprocessor is further programmed to calculate a target engine output and control said output varying mechanism so that the output of said engine coincides with said target engine output.

8. A drive force control device of an engine of a vehicle, the engine driving a drive wheel of the vehicle, the control device comprising:

a fuel injection valve for injecting fuel into the engine,
a mechanism for varying the output of the engine,
sensors for detecting a slip of the drive wheel, and
a microprocessor programmed to:
selectively control a combustion state of said engine to either of uniform combustion and stratified combustion via said fuel injection valve,
control said output varying mechanism so as to reduce the output of said engine when the slip of the drive wheel is detected, and
control the combustion state of said engine to uniform combustion as the output of said engine is reduced by said output varying mechanism.

9. A drive force control device as defined in claim 8, wherein said microprocessor is further programmed to return the combustion state of said engine to a combustion state before the output reduction of said engine was started by said output varying mechanism when the output reduction of said engine by said output varying mechanism has terminated.

10. A drive force control device as defined in claim 9, further comprising a sensor for detecting a load state of said engine, and wherein said microprocessor is further programmed to control a variation rate of said combustion state between said uniform combustion and stratified combustion according to said load state of said engine.

11. A drive force controller as defined in claim 10, wherein said load detecting sensor comprises a sensor for detecting either of an intake air amount of said engine and a rotation speed of said engine.

12. A drive force control device as defined in claim 9, wherein said output varying mechanism comprises said fuel injection valve which stops fuel injection according to a signal from said microprocessor, and said microprocessor is further programmed to count a number of fuel injection valves in which fuel injection has stopped, and control a variation rate of said combustion state between said uniform combustion and stratified combustion according to said number.

13. A drive force control device as defined in claim 8, wherein said output varying mechanism comprises either of said fuel injection valve which stops fuel injection according to a signal from said microprocessor, and a throttle for reducing an intake air amount of said engine according to a signal from said microprocessor.

14. A drive force control device as defined in claim 8, wherein said output varying mechanism comprises a throttle for reducing an intake air amount of said engine according to a signal from said microprocessor, and said microprocessor is further programmed to control an opening of said throttle to an opening corresponding to said uniform combustion at a first rate, and subsequently control said opening corresponding to said signal at a second rate slower than said first rate, as the output of said engine is reduced by said output varying mechanism.

15. A drive force control device as defined in claim 8, wherein said microprocessor is further programmed to calculate a target engine output, and control said output varying mechanism so that the output of said engine coincides with said target engine output.

16. A drive force control device of an engine of a vehicle, the engine driving a drive wheel of the vehicle, the control device comprising:

a fuel injection valve for injecting fuel into the engine,
means for varying the output of the engine,
means for detecting a slip of the drive wheel,
means for selectively controlling an air-fuel ratio of an air-fuel mixture supplied to the engine via said fuel injection valve so that the air-fuel ratio is equal to either of an ordinary air-fuel ratio which is approximately equal to a stoichiometric air-fuel and a lean air-fuel ratio leaner than the ordinary air-fuel ratio,
means for controlling said output varying means so as to reduce the output of said engine when the slip of the drive wheel is detected, and
means for commanding said means for selectively controlling so as to limit the air-fuel ratio of said air-fuel mixture to the ordinary air-fuel ratio, when the output varying means reduces the output of said engine.

17. A drive force control device of an engine of a vehicle, the engine driving a drive wheel of the vehicle, the control device comprising:

a fuel injection valve for injecting fuel into the engine,
means for varying the output of the engine,
means for detecting a slip of the drive wheel,
means for selectively controlling a combustion state of said engine to either of uniform combustion and stratified combustion via said fuel injection valve,
means for controlling said output varying means so as to reduce the output of said engine when the slip of the drive wheel is detected, and
means for commanding said means for selectively controlling so as to limit the engine to uniform combustion, when the output varying means reduces the output of said engine.

* * * * *